United States Patent [19]

Brown et al.

[11] Patent Number: 4,629,663
[45] Date of Patent: Dec. 16, 1986

[54] REMOVABLE PRESSURE-SENSITIVE ADHESIVE TAPE

[75] Inventors: Francis W. Brown, West St. Paul; Louis E. Winslow, Stillwater, both of Minn.

[73] Assignee: Minnesota Mining and Manufacturing Company, St. Paul, Minn.

[21] Appl. No.: 666,269

[22] Filed: Oct. 29, 1984

[51] Int. Cl.$^4$ ............................................. C09J 7/02
[52] U.S. Cl. ................................. 428/343; 428/355; 524/156; 526/304
[58] Field of Search ............... 428/343, 355, 474, 336; 524/66, 156, 814; 560/193; 526/304

[56] References Cited

U.S. PATENT DOCUMENTS

| | | | |
|---|---|---|---|
| 3,316,200 | 4/1967 | Hatala | 524/156 |
| 3,551,479 | 12/1970 | Emmons | 560/193 |
| 3,617,368 | 11/1971 | Gibbs et al. | 428/336 |
| 3,770,708 | 11/1973 | Knoepfel et al. | 526/304 |
| 3,922,464 | 11/1975 | Silver et al. | 428/355 |
| 3,931,087 | 1/1976 | Bastz et al. | 524/814 |
| 4,012,560 | 3/1977 | Basty et al. | 428/474 |
| 4,387,172 | 6/1983 | Agarwal et al. | 524/60 |
| 4,387,174 | 6/1983 | Lundberg et al. | 524/66 |

*Primary Examiner*—Thomas J. Herbert
*Attorney, Agent, or Firm*—Donald M. Sell; James A. Smith; Richard E. Brink

[57] ABSTRACT

The adhesive layer of the novel pressure-sensitive adhesive tape comprises a polymer of a terminally unsaturated vinyl monomer such as isooctyl acrylate and an emulsifier monomer such as sodium styrene sulfonate. Preferably, the adhesive layer also contains a small amount of a noncationic external emulsifier such as sodium dodecylbenzene sulfonate. Although the tape has excellent adhesive properties, it is removable from a variety of surfaces after one hour at 120° C. and so is useful for purposes such as automotive masking tape.

6 Claims, No Drawings

REMOVABLE PRESSURE-SENSITIVE ADHESIVE TAPE

FIELD OF THE INVENTION

The invention concerns pressure-sensitive adhesive tapes which usually are slit to narrow widths and then wound upon themselves for storage and shipment. Such tapes are originally produced in wide widths, and the term "tape" encompasses such wide widths. The invention specifically concerns removable pressure-sensitive adhesive tapes such as masking tapes, weatherstripping tapes, label tapes, and protective plating tapes.

BACKGROUND ART

Over a period of many years, the manufacture of pressure-sensitive adhesive tapes has been shifting from organic solvent systems to aqueous latices in order to reduce air pollution and fire hazard and also to eliminate the rising expense of organic solvents. Surfactants, wetting agents, or emulsifying agents are commonly used to protect the aqueous latex from coagulation, but as is pointed out in U.S. Pat. No. 3,551,479 (Emmons), "migration of the emulsifying agent to the surface of the film has a deleterious effect upon several properties such as adhesion . . . " (col. 2, lines 3–5). While the Emmons patent does not mention pressure-sensitive adhesives it is of interest for its suggestion of "using an emulsifying agent that is bound to the polymer . . . " (col. 1, lines 46–47).

U.S. Pat. No. 3,617,368 (Gibbs) concerns heat-sealable barrier coats made from an aqueous latex including an emulsifying agent that is bound to the polymer, called a "copolymerizable ionic material" (col. 3, line 3). The Gibbs patent suggests using "very small amounts of conventional wetting agents . . . to further aid in the attainment of particles of desired size" (col. 3, lines 48–55).

U.S. Pat. No. 3,770,708 (Knoepfel et al.) discloses pressure-sensitive adhesive tape, the adhesive layer of which is a copolymer of vinyl monomers such as a non-tertiary alkyl acrylate and zwitterionic monomer which in part serves as an emulsifying agent that is bound to the polymer. Such emulsifying agents are hereinafter referred to as "emulsifier monomers". All of the Knoepfel working examples also employ conventional emulsifying agents which do not become bound to the polymer and are hereinafter referred to as "external emulsifiers". The pressure-sensitive adhesive tape of the Knoepfel patent is characterized by "outstanding shear strength combined with excellent tack and peel strength without requiring cure of the adhesive" (col. 2, lines 12–16).

The pressure-sensitive adhesive tape of U.S. Pat. No. 3,922,464 (Silver et al.) is similar to that of the Knoepfel patent except in these respects: (1) it is removable, (2) from 0.2 to 5% by weight of at least one vinyl-unsaturated, homopolymerizable emulsifier monomer is copolymerized with the Knoepfel monomers, and (3) the zwitterionic monomer can be omitted. In regard to the third difference, the Silver patent states: "It is often desirable to incorporate zwitterion monomers into pressure-sensitive adhesives used in preparing tapes of the present invention. Inclusion of, e.g., 3–5% (by weight) or more of such monomers greatly improves the cohesive and shear properties of the adhesive, and even smaller amounts have beneficial effects" (Col. 4, lines 52–57). Of the Silver examples, only the tape of Example 2 omits the zwitterion emulsifier monomers. Recent tests of that tape show submarginal adhesion and cohesion for many uses.

Most of the zwitterion emulsifier monomers used in the Silver examples are not currently commercially available and tend to be expensive to make. At only the 2% weight level used in most of Silver examples, a zwitterion emulsifier monomer might raise the price of the tape above what potential users would be willing to pay.

The Silver adhesives also preferably employ "small amounts of external emulsifier, especially where short chain emulsifier monomers are used. Such emulsifiers, which are commonly employed in the preparation of many copolymer latices, assist in initial suspension of the monomeric reactants and tend to result in a more homogeneous appearing emulsion than when they are omitted." (Col. 8, lines 39–55).

U.S. Pat. Nos. 3,931,087 and 4,012,560 (Baatz et al.) concern pressure-sensitive adhesive tape based on an interpolymer of a specific sulfonic acid as an emulsifier monomer, an alkyl acrylate or methacrylate such as 2-ethylhexyl acrylate, and an optional third monomer such as vinyl acetate. An external emulsifier is necessary to control the colloidal particle size and to prevent instability and coagulation of the emulsion (paragraph bridging cols. 2 and 3 of both Baatz patents).

Members of another class of emulsifier monomers, i.e., sodium and/or potassium-p-styrene sulfonate, have been copolymerized with various alkyl acrylates, dienes, styrene, and fluorinated vinyl monomers to produce polymers which are said to have both improved heat resistance and tensile strength according to "Polymer Preprints", Vol. 24 (2), August 1983, pages 37–38, a publication of Division of Polymer Chemistry, Inc., American Chemical Society. Specifically reported are tests on copolymers of n-butyl acrylate and sodium and potassium salts of styrene sulfonate. No mention is made as to their utility.

U.S. Pat. No. 3,316,200 (Hatala) concerns aqueous paint vehicles and paints based on copolymers of terminally unsaturated vinyl monomer, preferably an acrylic polymer, and an emulsifier monomer which is there called an ionogenic unit. Among a large number of listed ionogenic units are sodium and potassium styrene sulfonate.

U.S. Pat. No. 4,387,172 (Agarwal et al.) describes emulsion type adhesive compositions such as may be obtained by copolymerizing a conjugated diene such as isoprene with a sulfonate containing monomer such as sodium styrene sulfonate. To the resultant latex is added a tackifier resin, and the emulsion is then doctor-bladed onto a substrate and dried to form a tacky adhesive film.

DISCLOSURE OF INVENTION

The invention provides a pressure-sensitive adhesive tape comprising a self-sustaining backing sheet carrying a layer of pressure-sensitive adhesive which can be made from materials that are currently commercially available, has excellent adhesive and cohesive strengths, and yet like tapes of the Silver patent can be cleanly removed from a variety of surfaces after one hour at 120° C. Approximately like adhesives of the Silver patent, that of the present invention is a copolymer of monomers consisting essentially of (a) from 95 to 99.8 parts by weight of at least one terminally unsaturated vinyl monomer, 60 to 100 weight percent of said vinyl monomer being selected from the class of nontertiary alkyl acrylates wherein each alkyl group has at least half of its carbon atoms in a single chain and the average length of the alkyl chain is at least 4 and not more than 12, and (b) from 0.2 to 5 parts by weight of at least one vinyl-unsaturated, homopolymerizable emulsifier monomer which is a surfactant having both a hydrophobic and a hydrophilic moiety, contains at least 5 but not more than 40 carbon atoms, and is water-dispersible, the total parts by weight of (a) plus (b) being 100, and said adhesive layer preferably contains a small amount of an external emulsifier.

The adhesive of the novel tape differs from that of the Silver patent in that the emulsifier monomer comprises a monovalent salt of a styrene sulfonate. As compared to emulsifier monomers named in the Silver patent, a monovalent salt of a styrene sulfonate more reliably produces substantially coagulum-free latices, both the latices and polymers produced therefrom tend to have greater hydrolytic stability, and latices of higher solids can be obtained which are easier to coat. By substantially coagulum-free is meant a latex which neither hangs up on a stirrer nor prematurely plugs up a filter. In the present invention, a substantially coagulum-free latex can be obtained without external emulsifier, although at least 0.05 weight percent of external emulsifier would be preferred in commercial production to provide a margin of safety. Preferably the external emulsifier is noncationic and does not exceed 1.5% of the adhesive layer.

Unlike the adhesives of all but one of the Silver patent examples, zwitterion monomer is not needed in tapes of the invention to provide good adhesion and cohesion.

Preferred tapes of the invention have an Adhesive Value (as defined below) of at least 40 N/dm, and a Cohesive Value (as defined below) of at least 100 minutes. Even at the significantly higher Adhesive and Cohesive Values exhibited by preferred tapes of the invention, such tapes can be cleanly removed from many substrates after one hour at 120° C. Most of those preferred tapes of the invention can be cleanly removed from the melamine resin test surface used in the Silver patent after one hour at 150° C., as can many of Silver's tapes. By possessing both clean removability and high Adhesive and Cohesive values, tapes of the invention are particularly useful as automotive masking tapes.

Preferably from 0.5 to 2 weight percent of a monovalent salt of a styrene sulfonate is used in making the copolymer of the adhesive of the tape of the invention in order to attain desirably high Cohesive Value. To employ above about 5 weight percent of a monovalent salt may make it difficult to maintain desirable Adhesive Values.

Tapes of the invention can be made with terminally unsaturated vinyl monomers as disclosed in col. 3, line 28 through col. 4, line 2 of the Silver patent. Those used in the examples below are listed in Table A together with abbreviations used in Table B.

TABLE A

| | Abbreviations |
|---|---|
| Acrylate Monomers | |
| isooctyl acrylate | IOA |
| isononyl acrylate | INA |
| Modifying Comonomers | |

TABLE A-continued

| | Abbreviations |
|---|---|
| N—tert-octylacrylamide | OACM |
| N—tert-butylacrylamide | TBAM |
| N—tert-amylacrylamide | TAAM |
| N—isopropylacrylamide | IPAM |
| isobutyl acrylate | IBA |
| ethyl acrylate | EA |

N-tert-octylacrylamide has the formula $CH_2=CHCONHC(CH_3)_2CH_2C(CH_3)_3$.

Latices of this invention have been made (1) by a single monomer-charge process, (2) by incremental or continuous monomer feed processes, and (3) by seed polymerization. A seed latex may have a composition different from that of the final latex. For example, the seed latex may omit the emulsifier monomer. Both persulfate and persulfate-redox initiator systems have been used.

For uses requiring double-coated tape, a pressure-sensitive adhesive of the present invention may provide one or both layers. Such a double-coated tape has been made for a window-insulator kit to cover windows with sheets of heat-shrinkable, biaxially oriented polyethylene film. The backing of the tape was biaxially oriented poly(ethylene terephthalate) film having a thickness of 25 micrometers. The releasable pressure-sensitive adhesive of the invention covered the face of the tape to be adhered to the window frame, while the other face was covered by a pressure-sensitive adhesive having excellent specific adhesion to polyethylene, namely, a tackified styrene-diene block copolymer. A window-insulator kit including such a double-coated tape also is useful for temporarily covering boats and automobiles to protect them from the elements.

Testing

Before carrying out the tests described below, the tape should be held at 22° C. and 50% relative humidity for at least 24 hours and preferably more than 48 hours.

Adhesive Value

A strip of tape is adhered by its adhesive to a glass plate under the weight of one pass of a 2-kg hard rubber roller. The adhesive value is measured by attaching the free end of the tape to a scale and moving the glass plate away from the scale at a rate of about 3.8 centimeters per second while peeling the tape at an angle of 180°.

Cohesive Value

A strip of tape is adhered by its adhesive to a stainless steel plate under the weight of two passes of a 2-kg hard rubber roller with a free end of the tape extending beyond the plate and the adhesive contact area being ½ inch by ½ inch (1.27 cm by 1.27 cm . The plate is then positioned 2° from the vertical to prevent peeling, and a one-kg mass is suspended from the free end. The time at which the mass falls is the Cohesive value. The test is discontinued if the tape has not failed after 1000 minutes. Usually two specimens are tested and the results averaged.

Removability Test

This is the test described in U.S. Pat. No. 3,922,464 in column 7, lines 29-68. As there reported, removability is tested from glass microscope slides which have been dipped in catalyzed hexamethoxymethyl melamine and then cured.

EXAMPLE 1

A split-resin flask of 2000 ml capacity was fitted with a variable speed agitator, condenser, purging tube for introducing nitrogen, and a recording controller. The following materials were added to the flask while purging the flask with nitrogen:

|  | grams |
|---|---|
| Deionized water | 479.6 |
| Sodium bicarbonate | 0.48 |
| Sodium dodecyl benzene sulfonate | 1.18 |
| Sodium styrene sulfonate | 3.92 |
| Isooctyl acrylate | 341.0 |
| N—tert-octylacrylamide | 47.0 |

The solid N-tert-octylacrylamide was dissolved in the isooctyl acrylate before adding to the flask. The nitrogen purge was continued until the end of the run. The flask and its contents were heated to 40° C., at which temperature a first initiator charge of 0.24 g of potassium persulfate and 0.08 g of sodium meta-bisulfite was added.

A change in color of the emulsion indicated the start of polymerization. The temperature was held near 40° C. by cooling and heating during the remaining period of reaction. 1.6 ml of a 5% aqueous solution of sodium meta-bisulfite was added four hours after the first initiator charge, and 2.4 ml of a 5% aqueous solution of sodium meta-bisulfite and 2.4 ml of a 5% aqueous solution of potassium persulfate were added 7 hours after the first initiator charge. The emulsion was heated another 7½ hours to complete polymerization. The resulting latex had no coagulum.

Solids—44.4%
pH—8.0
viscosity—51 cps, Brookfield #1 spindle, 30 rpm.

The latex was coated onto 40-micrometer biaxially oriented poly(ethylene terephthalate) polyester film and dried to a thickness of about 28 micrometers. The resulting pressure-sensitive adhesive tape was tested for
Adhesive Value: 44 N/dm
Cohesive Value: >1000 min.

EXAMPLE 2

The procedure of Example 1 was repeated except as here indicated. One hour after adding the first initiator charge, the temperature was raised to 65° C. over a 45-minute period to speed up the reaction. 2.4 ml of a 5% aqueous solution of sodium meta-bisulfite and 2.4 ml of a 5% aqueous solution of potassium persulfate were added three hours after the first initiator charge while the temperature was held at 65° C. One hour later the emulsion was cooled. The resulting latex was free of coagulum.

Solids—44.9%
pH—7.7
Viscosity—84 cps.

The latex was coated onto polyester film as in Example 1 to provide a pressure-sensitive adhesive tape which was tested for
Adhesive Value: 45 N/dm
Cohesive Value: >1000 min.

EXAMPLE 3

The procedure of Example 1 was repeated except that there was only one initiator charge of 0.8 g potassium persulfate and 0.25 g sodium meta-bisulfite after which the emulsion was held near 40° C. for 4½ hours and then cooled to provide a coagulum-free latex.
Solids—45.4%
pH—8.3
Viscosity—63 cps.

The latex was coated onto polyester film as in Example 1 to provide a pressure-sensitive adhesive tape which was tested for
Adhesive Value: 46 N/dm
Cohesive Value: >1000 min.

EXAMPLE 4

To a 5000 ml split-resin flask equipped as in Example 1 were added the following:

|  | grams |
|---|---|
| Deionized water | 1606.0 |
| Sodium bicarbonate | 2.4 |
| Sodium styrene sulfonate | 20.0 |
| Isooctyl acrylate | 1706.8 |
| 1% Solution of tertiary dodecyl mercaptan in isooctyl acrylate | 33.2 |
| N—tert-octylacrylamide | 240.0 |
| Sodium dodecyl benzene sulfonate | 6.0 |

The flask and its contents were purged with nitrogen while stirring and heating to 40° C., and a first initiator charge of 1.2 g potassium persulfate and 0.4 g sodium meta-bisulfite was added. Polymerization started in about ½ hour. The temperature was held at 40° C. by cooling and heating as required during the polymerization. 8 ml of a 5% aqueous solution of sodium meta-bisulfite was added 5 hours after the first initiator charge, and 12 ml of a 5% aqueous solution of sodium meta-bisulfite and 12 ml of a 5% aqueous solution of potassium persulfate were added 7 hours after the first initiator charge. The emulsion was heated another 9 hours to complete the polymerization. The resulting latex had no coagulum.
Solids—54.8%
pH—8.77
Viscosity—1348 cps, Brookfield #3 spindle, 30 rpm.

The latex was coated onto polyester film as in Example 1 and dried to a thickness of 34 micrometers. The resulting pressure-sensitive adhesive tape was tested for
Adhesive Value: 58 N/dm
Cohesive Value: >1000 min.

As compared to the tapes of Examples 1, 2, and 3, the improvement in Adhesive Value is attributed to the small amount of tertiary dodecyl mercaptan used in the polymerization process.

EXAMPLE 5

Example 4 was repeated except that the tertiary dodecyl mercaptan was omitted.
Adhesive Value: 47 N/dm
Cohesive Value: >1000 min.

EXAMPLE 6

The following materials were added to a 2000 ml split-resin flask which was equiped as described in Example 1.

| | grams |
|---|---|
| Deionized water | 400.0 |
| Sodium dodecyl benzene sulfonate | 4.0 |
| Sodium styrene sulfonate | 4.0 |
| Isooctyl acrylate | 316.0 |
| N—Isopropylacrylamide | 20.0 |
| Ethyl acryate | 60.0 |
| Tertiary dodecyl mercaptan | 0.1 |

The flask and its contents were purged with nitrogen while stirring and heating to 50° C. At 50° C. was added 1.04 g of a solution of 0.22 g of ferrous sulfate heptahydrate in 100 g deionized water, 0.48 g potassium persulfate and 0.24 g sodium meta-bisulfite. After about 45 minutes, polymerization started and the temperature rose to 70° C. over a 30-minute period. After one hour at 70° C., the flask was cooled. The resulting latex had no coagulum.

Solids—49.3% pH—5.25 viscosity—15,300 cps

The latex was coated onto polyester film as in Example 1 to provide a pressure-sensitive tape which was tested for Adhesive value: 39 N/dm Cohesive value: >1000

EXAMPLES 7-25

A number of other emulsions were prepared by procedures used in earlier examples and converted into tapes as in Example 1. The results reported in Table B include gel fractions in tetrahydrofuran ("% Gel") of the adhesive layers. Also reported at the end of Table B as Comparative Example I is a tape made following Example 2 of U.S. Pat. No. 3,922,464, and as Comparative Example II, a tape similar to that of Example 12 except for omission of the monovalent salt of styrene sulfonate.

While the latex used in making the tape of Example 9 in the laboratory was substantially coagulum-free, its coagulum content was such that it is doubtful that it could be consistently manufactured on a commercial scale. Examples 10–12 demonstrated that increased, but still small, amounts of the external emulsifier should eliminate this problem.

Removability Testing

Many of the tapes of Examples 1–25 were subjected to the aforementioned Removability Test. All tapes that were tested were cleanly removable, as was the tape of Comparative Example I.

TABLE B

| Example | Monomers | Ratio | External Emulsifiers Level | Adhesive Value (N/dm) | Cohesive Value (min.) | % Gel |
|---|---|---|---|---|---|---|
| 1 | IOA:OACM:NaSS | 87:12:1 | A | 0.3 | 44 | >1000 | 86 |
| 2 | IOA:OACM:NaSS | 87:12:1 | A | 0.3 | 45 | >1000 | 83 |
| 3 | IOA:OACM:NaSS | 87:12:1 | A | 0.3 | 46 | >1000 | 87 |
| 4 | IOA:OACM:NaSS | 87:12:1 | A | 0.3 | 58 | >1000 | NT |
| 5 | IOA:OACM:NaSS | 87:12:1 | A | 0.3 | 47 | >1000 | NT |
| 6 | IOA:EA:IPAM:NaSS | 79:15:5:1 | A | 1.0 | 39 | >1000 | NT |
| 7 | IOA:OACM:NaSS | 87:12:1 | None | None | 41 | >1000 | NT |
| 8 | IOA:OACM:NaSS | 87:12:1 | A | 0.003 | 41 | >1000 | NT |
| 9 | IOA:OACM:NaSS | 87:12:1 | A | 0.01 | 42 | >1000 | NT |
| 10 | IOA:OACM:NaSS | 87:12:1 | A | 0.05 | 45 | >1000 | NT |
| 11 | IOA:OACM:NaSS | 87:12:1 | A | 0.15 | 47 | >1000 | NT |
| 12 | IOA:OACM:NaSS | 87:12:1 | A | 1.0 | 48 | >1000 | 82 |
| 13 | IOA:IBA:NaSS | 86:13:1 | A | 0.3 | 37 | 804 | 87 |
| 14 | IOA:OACM:NaSS | 87:12:1 | B | 0.3 | 37 | >1000 | 85 |
| 15 | IOA:OACM:NaSS | 87:12:1 | C | 0.3 | 50 | >1000 | 84 |
| 16 | IOA:OACM:NaSS | 87:12:1 | D | 0.3 | 46 | >1000 | 82 |
| 17 | IOA:OACM:NaSS | 87:12:1 | E | 0.3 | 45 | >1000 | 84 |
| 18 | IOA:OACM:NaSS | 87:12:1 | F | 0.3 | 44 | >1000 | 77 |
| 19 | IOA:NaSS | 98.5:1.5 | A | 0.3 | 40 | >1000 | NT |
| 20 | IOA:NaSS | 99.25:0.75 | A | 0.3 | 38 | >1000 | NT |
| 21 | IOA:OACM:NaSS | 79.0:19.5:1.5 | A | 0.3 | 53 | >1000 | NT |
| 22 | IOA:TBAM:NaSS | 91:8:1 | A | 1.0 | 51 | >1000 | NT |
| 23 | IOA:EA:TBAM:NaSS | 78.5:15:5:1.5 | A | 1.0 | 47 | >1000 | NT |
| 24 | IOA:TAAM:NaSS | 90.9:8.0:1.1 | A | 0.3 | 45 | >1000 | NT |
| 25 | INA:OACM:NaSS | 87:12:1 | A | 0.3 | 44 | >1000 | NT |
| Comparative I | IOA:IBA:SEMNa | 86:13:1 | A | 2.0 | 15 | 3 | 86 |
| Comparative II | IOA:OACM | 87.5:12.5 | A | 1.0 | 21 | 4 | NT |

NT = not tested
NaSS = sodium styrene sulfonate
SEMNa = sodium (2-sulfoethyl)methacrylatea
A = sodium dodecyl benzene sulfonate
B = sodium alkylaryl polyethoxy sulfonate
C = sodium alkylaryl polyethoxy sulfate
D = sodium lauryl sulfate
E = nonyl phenol ethoxylate (10 moles ethylene oxide)
F = sodium N—lauryl betaiminodipropionate

We claim:

1. Pressure-sensitive adhesive tape comprising a self-substaining backing sheet carrying a layer of pressure-sensitive adhesive comprising a copolymer of monomers comprising
  (a) from 95 to 99.8 parts by weight of at least one terminally unsaturated vinyl monomer, 60 to 100 weight percent of said monomer being selected from the class of nontertiary alkyl acrylates wherein each alkyl group has at least half of its carbon atoms in a single chain and the average length of the alkyl chain is at least 4 and not more than 12, and (b) from 0.2 to 5 parts by weight of at least one vinyl-unsaturated homopolymerizable emulsifier monomer which is a surfactant having both a hydrophobic and a hydrophilic moiety, contains at least 5 but no more than 40 carbon atoms, and is water-dispersible, the total parts by weight (a) plus (b) being 100, wherein the improvement comprises:

the emulsifer monomer is a monovalent salt of a styrene sulfonate and wherein the adhesive layer contains up to 1.5% external emulsifier by weight, whereby the tape not only has an adhesive value of at least about 40 N/dm and a cohesive value of at least 100 minutes but also can be cleanly removed from a melamine test surface after one hour at 150? C.

2. Pressure-sensitive adhesive tape as defined in claim 1 wherein said monomers are free from zwitterion monomer.

3. Pressure-sensitive adhesive tape as defined in claim 1 wherein the monovalent salt is sodium styrene sufonate.

4. Pressure-sensitive adhesive tape as defined in claim 1 wherein said vinyl monomer includes an N-substituted acrylamide.

5. Pressure-sensitive adhesive tape as defined in claim 1 wherein the amount of the emulsifier monomer is from 0.5 to 2 weight percent.

6. The adhesive of a pressure-sensitive adhesive tape as defined in claim 1.

* * * * *